(12) United States Patent
Lauder et al.

(10) Patent No.: US 10,150,567 B2
(45) Date of Patent: Dec. 11, 2018

(54) ROTOR SYSTEMS FOR ROTORCRAFT

(71) Applicant: Sikorsky Aircraft Corporation, Stratford, CT (US)

(72) Inventors: Timothy Fred Lauder, Oxford, CT (US); Patrick Boyle, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 154 days.

(21) Appl. No.: 15/008,002

(22) Filed: Jan. 27, 2016

(65) Prior Publication Data

US 2017/0210480 A1   Jul. 27, 2017

(51) Int. Cl.
    *B64D 27/24*      (2006.01)
    *B64C 27/10*      (2006.01)
    *B64D 27/02*      (2006.01)

(52) U.S. Cl.
    CPC ............. *B64D 27/24* (2013.01); *B64C 27/10* (2013.01); *B64D 2027/026* (2013.01)

(58) Field of Classification Search
    CPC ........ B64C 2201/108; B64C 2201/042; B64C 27/08; B64C 27/10; B64C 27/12; B64C 27/025
    See application file for complete search history.

(56) References Cited

U.S. PATENT DOCUMENTS

| | | | | |
|---|---|---|---|---|
| 3,722,830 A | * | 3/1973 | Barber | B64C 19/00 244/17.23 |
| 7,712,701 B1 | * | 5/2010 | Ehrmantraut | B64C 27/20 244/17.23 |
| 7,789,341 B2 | * | 9/2010 | Arlton | B64C 27/10 244/17.23 |
| 8,083,173 B2 | | 12/2011 | Arlton et al. | |
| 8,146,854 B2 | | 4/2012 | Lawrence | |
| 8,469,306 B2 | | 6/2013 | Kuhn, Jr. | |
| 8,469,307 B2 | | 6/2013 | Arlton et al. | |
| 8,844,860 B2 | * | 9/2014 | Lundgren | B64C 39/024 244/17.13 |
| 8,931,732 B2 | | 1/2015 | Sirohi et al. | |
| 9,434,471 B2 | * | 9/2016 | Arlton | B64C 27/14 |
| 2004/0129833 A1 | * | 7/2004 | Perlo | B64C 27/20 244/70 |
| 2005/0082421 A1 | * | 4/2005 | Perlo | A63H 27/12 244/12.2 |
| 2006/0060693 A1 | * | 3/2006 | Poltorak | B64C 27/10 244/17.11 |

(Continued)

OTHER PUBLICATIONS

Sketches and Statistics of V3Lama Schematic.

*Primary Examiner* — Benjamin P Lee
(74) *Attorney, Agent, or Firm* — Cantor Colburn LLP (57) ABSTRACT

A rotor system for a rotorcraft includes a first rotor assembly defining a rotation axis, a second rotor assembly offset from the first rotor assembly along the rotation axis, and a drive system connected to the first and second rotor assemblies. The drive system includes a first electric motor disposed along the rotation axis and operably connected to the first rotor assembly, and a second electric motor disposed along the rotation axis and operably connected to the second rotor assembly to rotate the second rotor assembly about the rotation axis independent of rotation of the first rotor assembly about the rotation axis.

21 Claims, 5 Drawing Sheets

(56) References Cited

U.S. PATENT DOCUMENTS

| | | | |
|---|---|---|---|
| 2014/0284419 A1* | 9/2014 | Groenewald | B64C 27/10 244/8 |
| 2015/0014475 A1* | 1/2015 | Taylor | B64C 39/024 244/6 |
| 2016/0211720 A1* | 7/2016 | Koegler | F16C 1/00 |
| 2016/0288901 A1* | 10/2016 | Fisher | B64C 11/02 |

* cited by examiner

ROTOR SYSTEMS FOR ROTORCRAFT

BACKGROUND OF THE INVENTION

1. Field of the Invention

The present disclosure relates to rotor systems, and more particularly to drive systems for rotor systems in rotorcraft.

2. Description of Related Art

Rotorcraft like helicopters commonly employ rotor systems to provide lift and control of the rotorcraft. Helicopters, for example, generally include a main rotor system supported by the rotorcraft airframe for rotation about the airframe. As the main rotor system rotates and applies torque to the airframe, a tail rotor system rotatably supported by the airframe applies thrust to counteract the torque applied to the airframe by the main rotor system. Rotational energy for such rotor systems is typically supplied by a turbine engine, which is carried by the airframe and connected to the main rotor system and tail rotor system through a transmission. Because turbine engines typically operate at higher rotational speeds than the main rotor system and tail rotor system of rotorcraft, rotorcraft transmissions generally includes a reduction gearbox. The reduction gearbox typically receives mechanical rotation from the turbine engine through a high-speed shaft and outputs the mechanical rotation into low-speed rotation, which the reduction gearbox provides to the rotorcraft rotor systems through a low-speed shaft. Reduction gearboxes and transmission components in such rotorcraft are typically carefully manufactured and maintained for reliable operation.

Such conventional methods and systems have generally been considered satisfactory for their intended purpose. However, there is still a need in the art for improved rotor systems and rotorcraft employing such rotor systems. The present disclosure provides a solution for this need.

SUMMARY OF THE INVENTION

A rotor system for a rotorcraft include a first rotor assembly defining a rotation axis, a second rotor assembly axially offset from the first rotor assembly along the rotation axis, and a drive system operably connected to the first and second rotor assemblies. The drive system includes a first electric motor and a second electric motor. The first electric motor is connected to the first rotor assembly to rotate the first rotor assembly about the rotation axis. The second electric motor is connected to the second rotor assembly and to rotate the second rotor about the rotation axis independent of rotation of the first rotor assembly about the rotation axis. A controller is operably connected to the first electric motor and the second electric motor configured to rotate the second rotor assembly about the rotation axis independently of rotation of the first rotor assembly about the rotation axis In certain embodiments, the first electric motor and the first rotor assembly can be coaxially arranged about the rotation axis of the rotor system. The first electric motor can include a rotor portion supported for rotation relative to a stator portion, and the rotor portion of the first electric motor can be fixed relative to the first rotor assembly. The stator portion of the first electric motor can be connected to a static mast, which can extend between the first rotor assembly and the second rotor assembly, and connect to the airframe. The rotor portion of the first electric motor can be disposed radially outward of the stator portion of the first electric motor relative to the rotation axis. The first electric motor can be arranged along the rotation axis between the first rotor assembly and the second rotor assembly.

In accordance with certain embodiments, the second electric motor can be coaxially arranged with the first rotor assembly. The second electric motor can be interposed along the rotation axis between the second rotor assembly and the first electric motor. The second electric motor can include a rotor portion supported for rotation relative to a stator portion of the second electric motor, and the rotor portion of the second electric motor can be fixed relative to the second rotor assembly. The stator portion of the second electric motor can be connected to the static mast. The rotor portion of the second electric motor can be disposed radially outward of the rotor portion of the second electric motor. It is contemplated that the first electric motor and/or the second electric motor can include a direct drive electric motor.

It is also contemplated that the rotor system can include a heat exchanger. The heat exchanger can be in thermal communication with the first electric motor. The heat exchanger can be connected to stator portion of the first electric motor. The heat exchanger can be axially interposed along the rotation axis between the first electric motor and the second electric motor. The heat exchanger can be a first heat exchanger, and the rotor system can include a second heat exchanger connected to the stator portion of the second electric motor. The second heat exchanger can be in thermal communication with the second electric motor. The second heat exchanger can be axially between the second electric motor and the first heat exchanger.

A method operating a rotor system includes receiving torque at a first rotor assembly and rotating the first rotor assembly about a rotation axis using the received torque independently of rotation of rotation of a second rotor assembly about the rotation axis. The torque can be received directly from a first electric motor. Rotation of the first rotor assembly about the rotation axis can include using the torque received from the first electric motor. Rotation of the first rotor assembly about the rotation axis can be varied relative to rotation of the second rotor assembly about the rotation axis, such as by varying rotational speed of the first rotor assembly about the rotation axis.

In certain embodiments, the method can include receiving torque at a second rotor assembly and rotating the second rotor assembly about the rotation axis using the received torque independently of rotation of rotation of the first rotor assembly about the rotation axis. The torque can be received directly from a second electric motor. Rotation of the second rotor assembly about the rotation axis can include using the torque received from the second electric motor. Rotation of the second rotor assembly about the rotation axis can be varied relative to rotation of the first rotor assembly about the rotation axis, such as by varying rotational speed of the second rotor assembly about the rotation axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
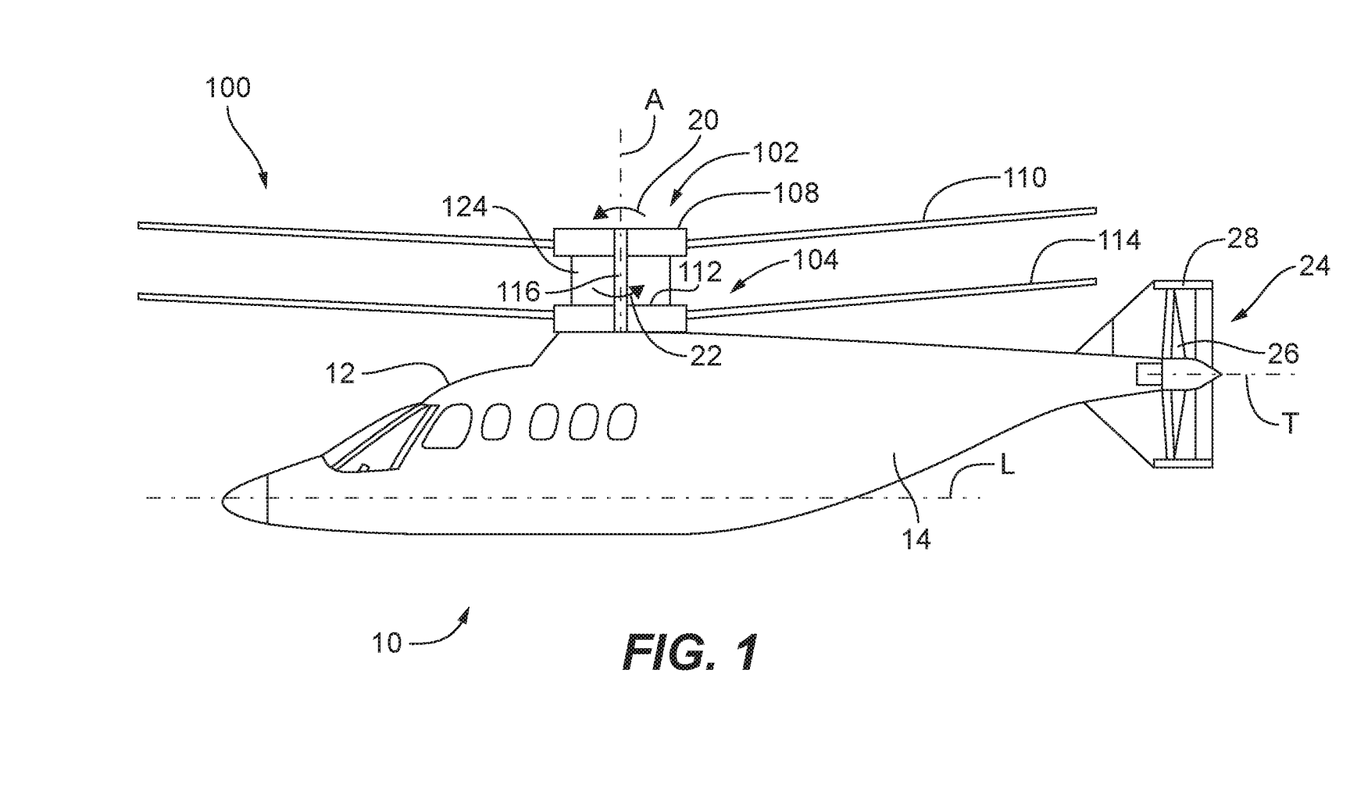
FIG. 1 is a schematic side elevation view of an exemplary embodiment of a rotorcraft constructed in accordance with the present disclosure, showing a rotor system and a drive system.

Reference will now be made to the drawings wherein like reference numerals identify similar structural features or aspects of the subject disclosure. For purposes of explanation and illustration, and not limitation, a partial view of an exemplary embodiment of a rotor system in accordance with the disclosure is shown in FIG. 1 and is designated generally by reference character 100. Other embodiments of rotor systems and rotorcraft including rotor systems in accordance with the present disclosure, or aspects thereof, are provided in FIGS. 2-5, as will be described. The systems and methods described herein can be used in coaxial, counter-rotating rotor systems, however the invention is not limited to a particular type of rotorcraft or to aircraft in general.

With reference to FIG. 1, a rotorcraft 10 is shown. Rotorcraft 10 includes an airframe 12 with a longitudinally extending tail 14, a translational thrust system 24, and a main rotor system 100. Translational thrust system 24 is mounted to longitudinally extending tail 14 of airframe 12 about a thrust axis T. Thrust axis T is oriented substantially horizontal and parallel to the aircraft longitudinal axis L to provide thrust for high-speed flight. In the illustrated exemplary embodiment, translational thrust system 24 includes a pusher propeller 26 mounted within an aerodynamic cowling 28 on longitudinally extending tail 14.

Rotor system 100 is supported by a static mast 116, which extends from airframe 12 and is fixed relative to airframe 12. Rotor system 100 generally includes a first rotor assembly 102, a second rotor system 104, and a drive system 120, each of which are carried by rotorcraft 10 externally to airframe 12. First rotor assembly 102 defines a rotation axis A and includes a rotor hub 108 and a plurality of rotor blades 110. Rotor hub 108 is disposed along rotation axis A and the plurality of rotor blades 110 extend laterally from rotor hub 108. Second rotor assembly 104 is coaxially arranged along rotation axis A with first rotor assembly 102, second rotor assembly 104 being axially interposed between first rotor assembly 102 and airframe 12 and including a rotor hub 112 and a plurality of rotor blades 114. Rotor hub 112 is disposed along rotation axis A and the plurality of rotor blades 114 extend laterally from rotor hub 112.

Drive system 120 is disposed along rotation axis A axially between first rotor assembly 102 and second rotor assembly 104. Drive system 120 is configured and adapted to rotate first rotor assembly 102 in first direction 20 about rotation axis A and to rotation second rotor assembly 104 in a second direction 22 about rotation axis A, first direction 20 being opposite second direction 22. Although a particular aircraft configuration is illustrated in this non-limiting embodiment, other counter-rotating, coaxial rotor systems as well as helicopters will also benefit from the present invention.

Figure 2:
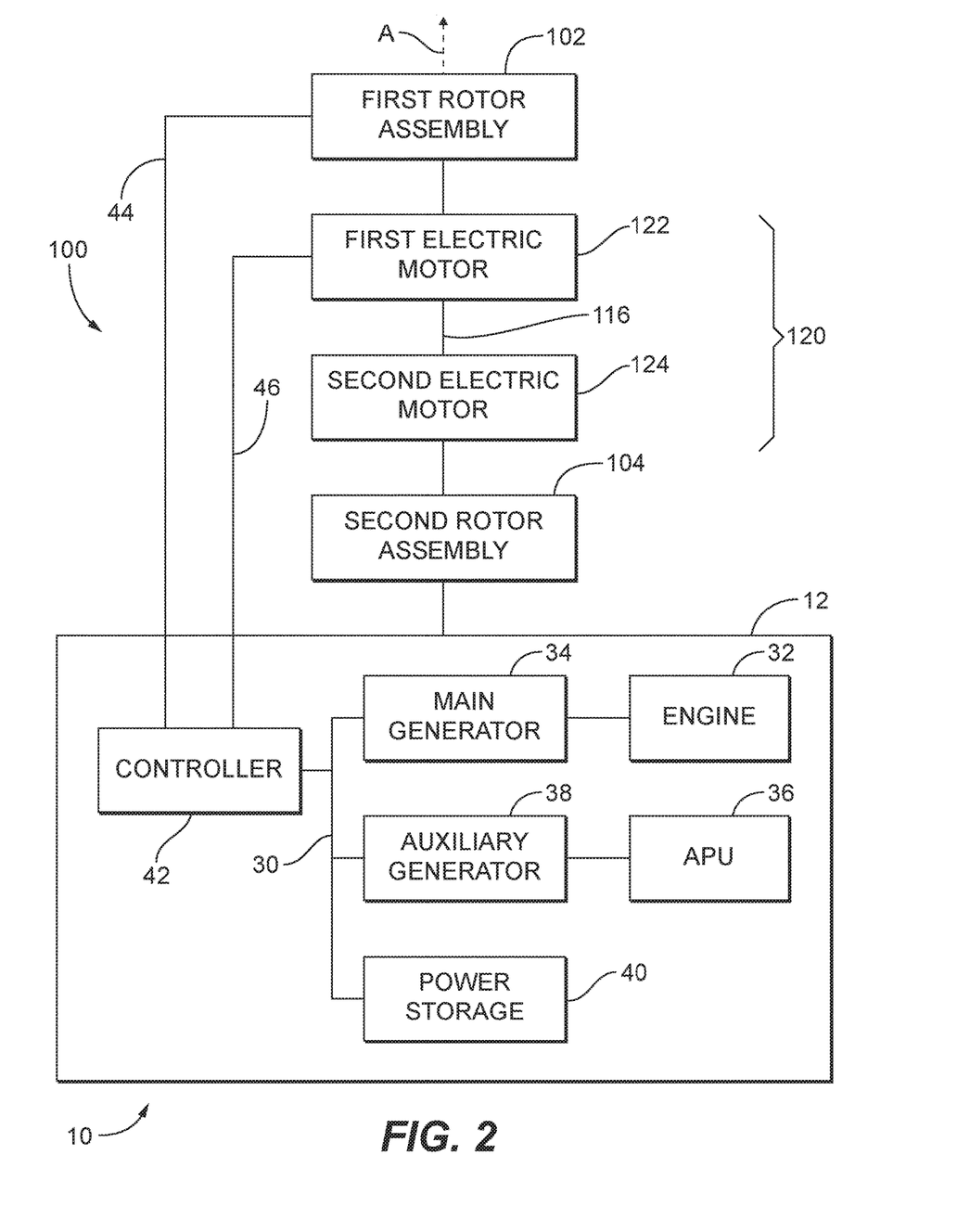
FIG. 2 is a schematic view of the rotorcraft of FIG. 1, showing electric motors of the drive system connected to sources of electrical power.

With reference to FIG. 2, rotor system 100 and drive system 120 are shown. Drive system 120 includes a first electric motor 122 and a second electric motor 124 that are operably connected to a controller 42. First electric motor 122 and second electric motor 124 are carried by rotorcraft 10 (shown in FIG. 1) externally of airframe 12. First electric motor 122 is arranged along rotation axis A, is coaxial with first rotor assembly 102, and is axially interposed between first rotor assembly 102 and second rotor assembly 104. Second electric motor 124 is arranged along rotation axis A, is coaxial with second rotor assembly 102, and is axially interposed between first electric motor 122 and second rotor assembly 104.

Drive system 120 is connected to one or more power sources which, in the illustrated exemplary embodiment, include a main generator 34, and auxiliary generator 38, and a power storage device 40, each of which are carried within airframe 12 of rotorcraft 10. Main generator 34 is operably connected to an engine 32, and is configured to provide electrical power to either or both of first electric motor 122 and second electric motor 124 through a power bus 30. Auxiliary generator 38 is operably connected to an auxiliary power unit (APU) 36, and is also configured to provide power to either or both of first electric motor 122 and second electric motor 124 through power bus 30. Power storage device 40 may include a battery or a capacitor, and is configured to provide to either or both first electric motor 122 and second electric motor 124 or receive power through power bus 30. In this respect power storage device 40 may be electrically charged by either or both main generator 34 and auxiliary generator 38 during normal operation, and may provide power when power is unavailable from main generator 34 and auxiliary generator 38, such as when rotorcraft 10 (shown in FIG. 1) enters an autorotation state. It is contemplated that power bus 30 can be an alternating current (AC) power bus, a direct current (DC) power bus, or a high-voltage direct current (HVDC) bus. In certain embodiment the HVDC bus is a 270-volt HVDC bus.

Controller 42 is operably connected between power bus 30 and drive system 120. A first lead 44 connects controller 42 to first electric motor 122 to provide power from the one or more power sources to first electric motor 122. A second lead 46 connects controller 42 to second electric motor 124 to provide power from the one or more power sources to second electric motor 124. It is contemplated that first lead 42 and second lead 44 can be fixed relative to static mast 116 and connected to stator portions (shown in FIG. 3) of first electric motor 122 and second electric motor 124.

Controller 42 includes a processor communicative with a non-transitory memory having recorded thereon one or more program modules. The one or more program modules have instructions that, when read by the processor, cause controller 42 to undertake certain actions. In this respect the instructions cause the processor to selectively route power from the one or more power sources to either or both of first electric motor 122 and second electric motor 124.

In embodiments, the instructions cause controller 42 to rotate one of first rotor assembly 102 and second rotor assembly 104 about rotation axis A independent of rotation of the other of first rotor assembly 102 and second rotor assembly 104, for example, by applying more power to one of first electric motor 122 and second electric motor 124 that to the other of first electric motor 122 and second electric motor 124. As will be appreciated by those of skill in the art in view of the present disclosure, this enables changing the rotational speed of one rotor assembly relative to the other rotor assembly independently. As will also be appreciated, this provides a mechanism for changing the flight characteristics of rotorcraft 10 (shown in FIG. 1), for example, by inducing yaw about rotation axis A.

In certain embodiments, the instructions cause controller 42 to select a power source from which to apply torque to either or both of the rotor assemblies. For example, the instructions can cause controller 42 to apply power to either or both the electric motors from auxiliary generator 38 and/or power source 40 when power is unavailable from main generator 34. Alternatively or additionally, the instructions can cause controller 42 to apply power to either or both electric motors from power source 40 when power is unavailable from both main generator 34 and auxiliary generator 38.

Figure 3:
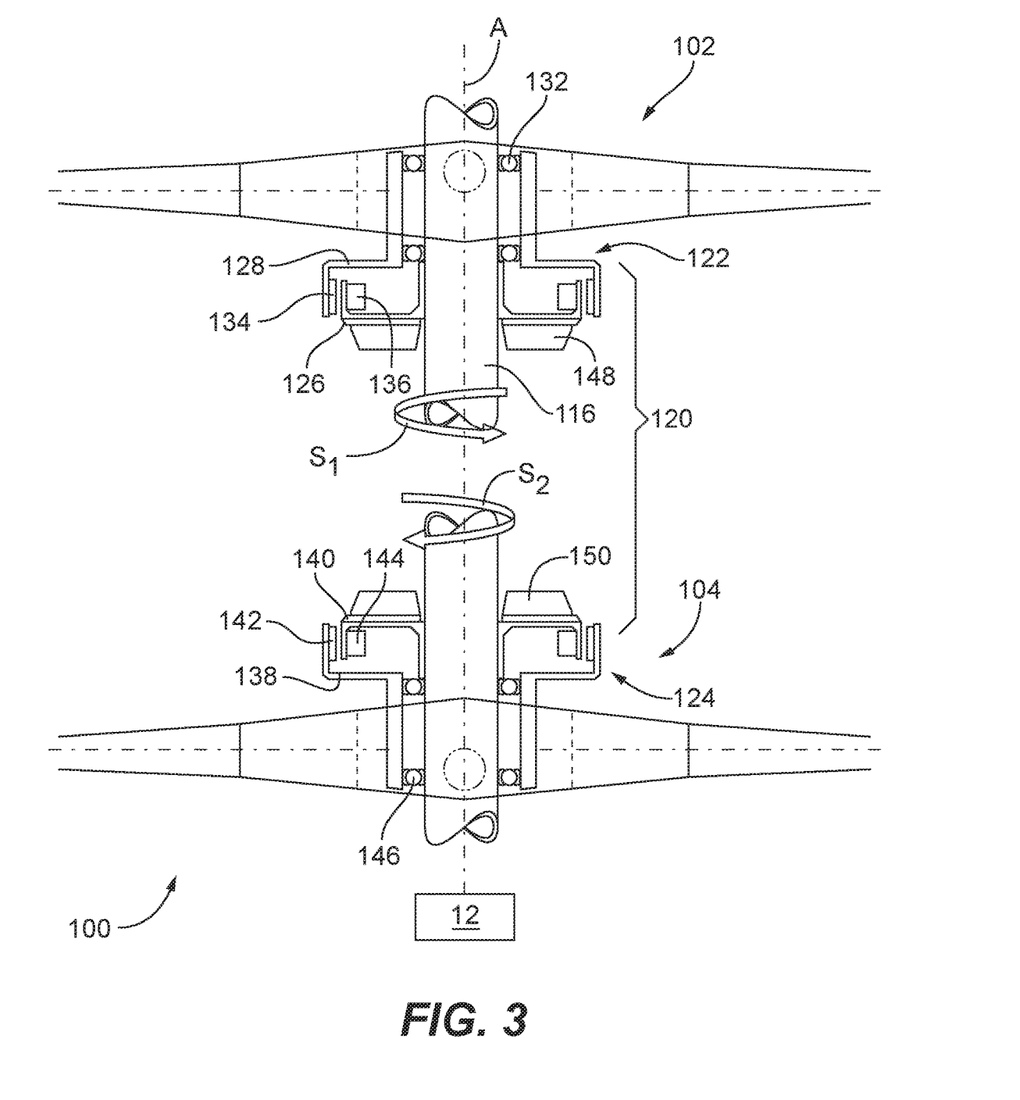
FIG. 3 is a schematic cross-section side view of the rotorcraft of FIG. 1, showing the rotor system and electric motors of the drive system.

With reference to FIG. 3, rotor system 100 and drive system 120 are shown. First rotor assembly 102 is rotatable about rotation axis A relative to static mast 116 a first speed $S_1$. Second rotor assembly 104 is rotatable about rotation axis A relative to both static mast 116 and first rotor assembly 102 at a second speed $S_2$. First speed $S_1$ is independently variable relative to second speed $S_2$ according to torque provided to first rotor assembly 102 by first motor 122. Second speed $S_2$ is independently variable relative to first speed $S_1$ according to torque provided to second rotor assembly 104 by second motor 124. In the illustrated exemplary embodiment, first rotor assembly 102 and second rotor assembly 104 are teetering rotor assemblies (indicated schematically with a pivot pin in each assembly). It is to be appreciated and understood that drive system 120 can also be used with an articulated rotor system or a rigid rotor system.

First electric motor 122 is supported externally of airframe 12 and is coaxially arranged about rotation axis A with both second electric motor 124, first rotor assembly 102, and second rotor assembly 104. In the illustrated exemplary embodiment, first electric motor 122 is directly connected to first rotor assembly 102, i.e. without an intervening gear element, and is axially interposed between second electric motor 124 and first rotor assembly 102 along rotation axis A.

First electric motor 122 includes a rotor portion 128 supported for rotation relative to a stator portion 126 about rotation axis A. Rotor portion 128 is fixed relative to first rotor assembly 102, and is disposed about a static mast 116 with a bearing member 132 radially interposed between static mast 116 and rotor portion 128. Rotor portion 128 carries a rotor electromagnetic element 134 fixed thereto, which may include a permanent magnet or winding, which is selectively in electromagnetic communication with a stator electromagnetic element 136 for rotating first rotor assembly 102 about rotation axis A.

Rotor portion 128 extends radially outward of stator portion 126 such that rotor electromagnetic element 134 axially overlaps stator electromagnetic element 136 at a radially outer location with a gap therebetween. Stator electromagnetic element 136 is fixed relative to static mast 116, and may include a permanent magnet or winding which is fixed to stator portion 126. In embodiments having one or more windings, the winding is electrically connected to power bus 30 (shown in FIG. 2) through first lead 42 (shown in FIG. 2) to receive electrical power for rotating first rotor assembly 102 in first direction 20 (shown in FIG. 1) independent of rotation of second rotor assembly 104 at first speed $S_1$. It is contemplated that first electric motor 122 can be a direct-drive electric motor, rotor portion 128 and rotor assembly 102 having a 1:1 speed ratio and thereby rotating at a common same rotational speed during operation. As will be appreciated, drive system 120 includes no reduction gearbox.

Second electric motor 124 is similar to first electric motor 122 with the difference that second electric motor 124 is directly connected to second rotor assembly 104 and is disposed axially between second rotor assembly 104 and first electric motor 122 along rotation axis A. Second electric motor 124 includes a rotor portion 138 supported for rotation about rotation axis A relative to a stator portion 140. Rotor portion 138 is fixed to second rotor assembly 104, and more particularly axially overlays second rotor assembly 104 above airframe 12 and below first rotor assembly 102. Rotor portion 138 is disposed about static mast 116 with a bearing member 146 radially interposed between static mast 116 and rotor portion 138. Rotor portion 138 carries a rotor electromagnetic element 142 fixed thereto, which may include a permanent magnet or winding, and which is selectively in electromagnetic communication with a stator electromagnetic element 144.

Rotor portion 138 extends radially outward of stator portion 140 such that rotor electromagnetic element 142 axially overlaps stator electromagnetic element 136 at a radially outward location with a gap therebetween. Stator electromagnetic element 144 is fixed to stator portion 140, and may include a permanent magnet or winding, which in turn is fixed to stator portion 126. In embodiments having one or more windings, the winding is electrically connected to power bus 30 (shown in FIG. 2) through second lead 44 (shown in FIG. 2) for receiving electrical power and rotating second rotor assembly in second direction 22 independent of rotation of first rotor assembly 102. It is contemplated that second electric motor 124 can be a direct-drive electric motor, rotor portion 140 and second rotor assembly 104 having a 1:1 speed ratio and thereby rotating at a common rotational speed, e.g., second speed $S_2$, during operation. The illustrated exemplary arrangement is gearless, and includes no intervening reduction gearbox.

Optionally, the illustrated exemplary drive system 120 includes a first heat exchanger 148 and a second heat exchanger 150. First heat exchanger 148 is in thermal communication with first electric motor 122 for dissipating heat generated therein from resistive heating of windings of first electric motor 122. In the illustrated exemplary embodiment first heat exchanger 148 is connected to stator portion 126 of first electric motor 122 such that first heat exchanger 148 is disposed axially along rotation axis A between first electric motor 122 and second electric motor 124.

Second heat exchanger 150 is similar in arrangement with first heat exchanger 148 with the difference that second heat exchanger 150 is in thermal communication with second electric motor 124 for dissipating heat generated therein from resistive heating of windings of second electric motor 124. In this respect second heat exchanger 150 is connected to stator portion 140 of second electric motor 124 such that second heat exchanger 150 is disposed axially along rotation axis A between second electric motor 124 and first electric motor 122.

Figure 4:
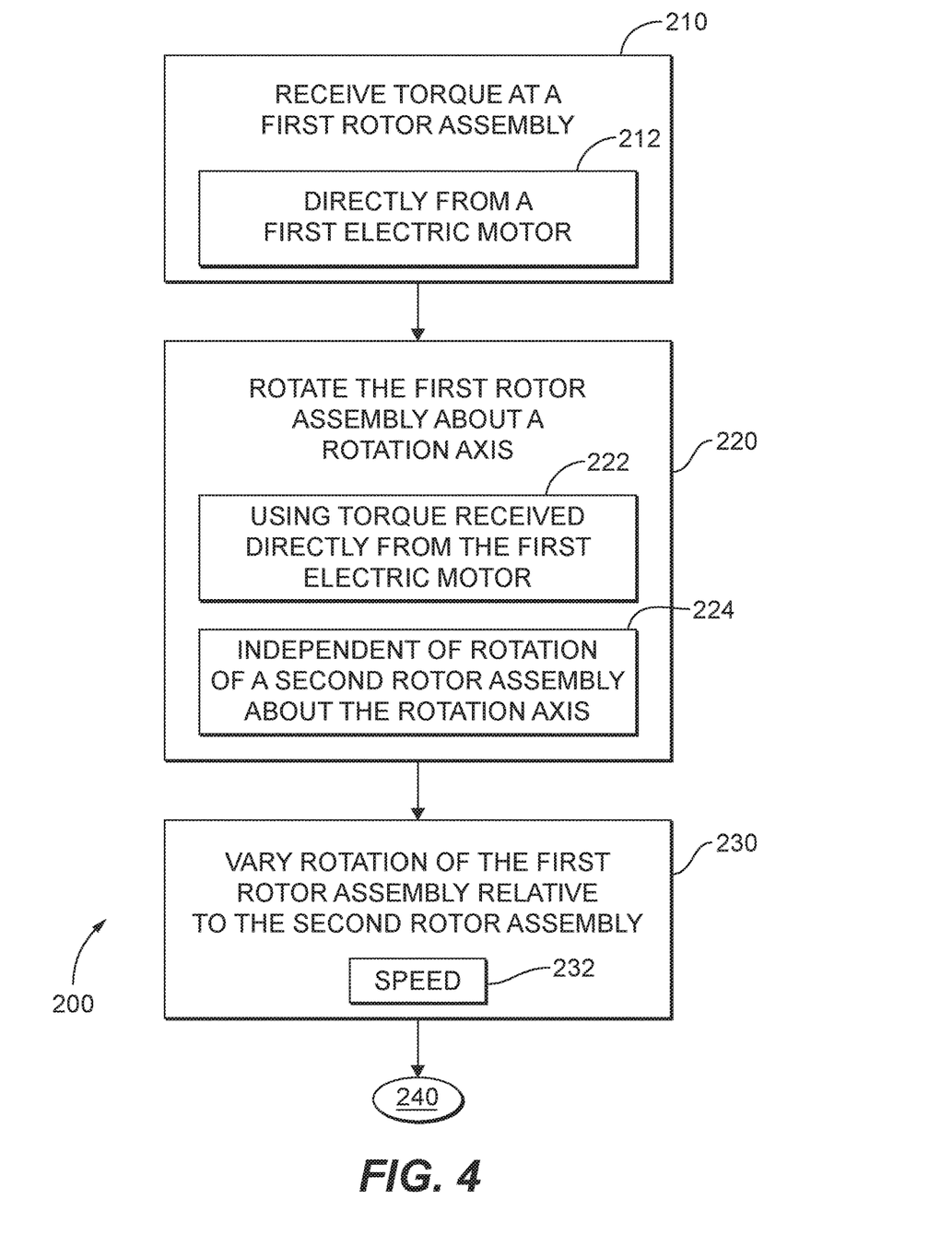
FIG. 4 is a chart of a method of operating a rotor system, showing steps for rotating a first rotor assembly of a rotor system independent of rotation of a second rotor assembly of the rotor system.
Figure 5:
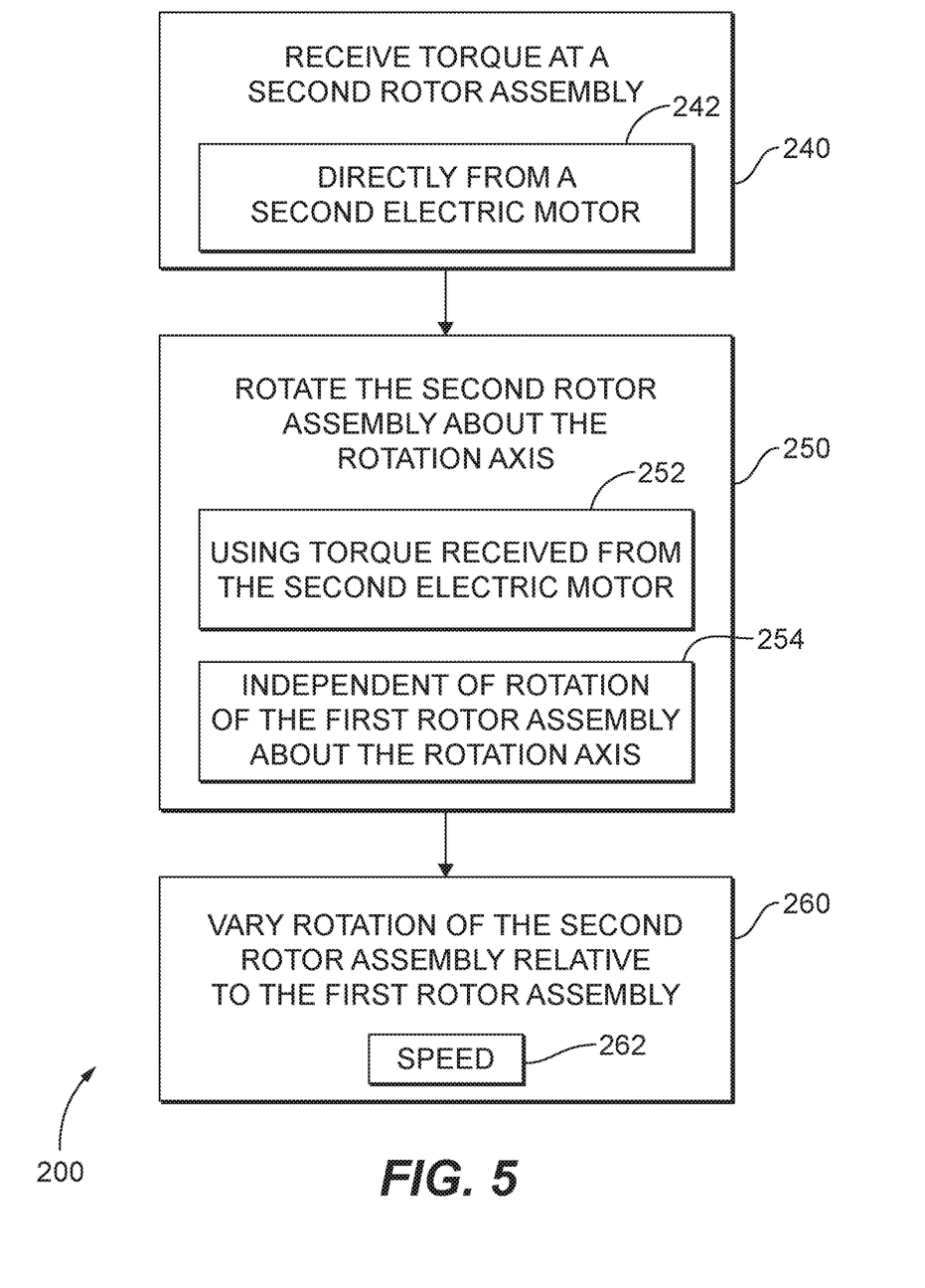
FIG. 5 is a chart of a method of operating a rotor system, showing steps for rotating the second rotor assembly of the rotor system independent of the first rotor assembly of the rotor system.

With reference to FIGS. 4 and 5, a method 200 of operating a rotor system, e.g., rotor system 100 (shown in FIG. 1), is shown. Referring to FIG. 4, method 200 generally includes receiving torque at a first rotor assembly as shown with box 210, rotating the first rotor assembly about a rotation axis as shown with box 220, and varying rotation of the first rotor assembly about the rotation axis relative to rotation of a second rotor assembly about the rotation axis, as shown with box 230. Receiving torque at the first rotor assembly, e.g., first rotor assembly 102 (shown in FIG. 1), can include receiving torque directly from a first electric motor, e.g., first electric motor 122 (shown in FIG. 1), as shown with box 212.

Rotating the first rotor assembly about the rotation axis, e.g., rotation axis A (shown FIG. 1) can include using torque received directly from the first electric motor, as shown with box 222. Rotating the first rotor assembly about the rotation axis can include rotating the first rotor assembly independent or rotation of a second rotor assembly, e.g., second rotor assembly 104, about the rotation axis, as shown with box 224. Varying the rotation of the first rotor assembly relative to the second rotor assembly can include varying the rotational speed of the rotor assembly about the rotation axis, e.g., speed $S_1$ (shown in FIG. 3), as shown with box 232.

Referring to FIG. 5, method 200 can also include receiving torque at a first rotor assembly as shown with box 240, rotating the first rotor assembly about a rotation axis as shown with box 250, and varying rotation of the first rotor assembly about the rotation axis relative to rotation of a second rotor assembly about the rotation axis as shown with box 260. Receiving torque at the second rotor assembly, e.g., second rotor assembly 104 (shown in FIG. 1), can include receiving torque directly from a second electric motor, e.g., second electric motor 124 (shown in FIG. 1), as shown with box 242.

Rotating the second rotor assembly about the rotation axis can include using torque received directly from the second electric motor, as shown with box 252. Rotating the second rotor assembly about the rotation axis can include rotating the second rotor assembly independent or rotation of a first rotor assembly about the rotation axis, as shown with box 254. Varying the rotation of the second rotor assembly relative to the first rotor assembly can include varying the rotational speed of the second rotor assembly about the rotation axis, e.g., speed $S_2$ (shown in FIG. 3), as shown with box 262. It is contemplated that either or both of speed $S_1$ and speed $S_2$ can be varied relative a static mast, e.g., static mast 116 (shown in FIG. 1), supporting both the first and second rotor assemblies relative to an airframe carrying the rotor assemblies, e.g., airframe 12 (shown in FIG. 1).

Helicopters typically employ drive systems based on turbine engine technology, which generally run at a fixed rotational speed. While satisfactory for their intended purpose, such drive systems can require relatively complex reduction gearboxes to transfer the torque and reduce the rotational speed of the turbine engine to a rotational speed suitable for the rotor system. Such reduction gearboxes typically fix the rotational speed of the rotor system and engine in a constant ratio. In embodiments described herein, direct drive electric motors are employed to independently drive coaxial rotor assemblies. This allows applying torque for the rotor assemblies without the use of intervening gearboxes, improving power and torque distribution within the aircraft. It also enables rotating either (or both) rotor assembly independently of the other, providing an additional mechanism to control the flight characteristics of the rotorcraft. Further, the independent rotor assembly control can provide improved efficiency, reduced vibrations, and/or enhanced control.

The methods and systems of the present disclosure, as described above and shown in the drawings, provide for rotor systems and rotorcraft with superior properties including improved control during flight. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A rotor system, comprising:
   a first rotor assembly defining a rotation axis;
   a second rotor assembly offset from the first rotor assembly along the rotation axis;
   a drive system operably connected to the first rotor assembly and the second rotor assembly, including:
     a first electric motor connected to the first rotor assembly and configured to rotate the first rotor assembly about the rotation axis; and
     a second electric motor connected to the second rotor assembly, wherein the first electric motor and the second electric motor are coaxially disposed along the rotation axis; and
   a controller operably connected to the first electric motor and the second electric motor, wherein while each of the first electric motor and the second electric motor is in operation, the controller is configured to rotate the second rotor assembly about the rotation axis independently of rotation of the first rotor assembly about the rotation axis; and
   a heat exchanger in thermal communication with the second electric motor, wherein the heat exchanger is disposed axially along the rotation axis between the first rotor assembly and the second rotor assembly.

2. The rotor system as recited in claim 1, wherein the first electric motor and the first rotor assembly are coaxially arranged about the rotation axis.

3. The rotor system as recited in claim 1, wherein the first electric motor includes a rotor portion supported for rotation relative to a stator portion, wherein the rotor portion of the first electric motor is fixed relative to the first rotor assembly.

4. The rotor system as recited in claim 1, further including a static mast extending between the first rotor assembly and the second rotor assembly, wherein the stator portion of the first electric motor is connected to the static mast.

5. The rotor system as recited in claim 1, wherein the rotor portion of the first electric motor is disposed radially outward of the first electric motor stator portion relative to the rotation axis.

6. The rotor system as recited in claim 1, wherein first electric motor is arranged along the rotation axis between the first rotor assembly and the second rotor assembly.

7. The rotor system as recited in claim 1, wherein either or both of the first electric motor and second electric motor is a direct drive electric motor.

8. The rotor system as recited in claim 1, further including a heat exchanger in thermal communication with the first electric motor, wherein the heat exchanger is disposed axially along the rotation axis between the first rotor assembly and the second rotor assembly.

9. The rotor system as recited in claim 1, wherein second electric motor is arranged along the rotation axis between the first rotor assembly and the second rotor assembly.

10. The rotor system as recited in claim 1, wherein the first rotor assembly and the second rotor assembly include teetering rotor assemblies.

11. A rotorcraft, comprising:
    an airframe;
    a first rotor assembly defining a rotation axis and supported for rotation about the rotation axis by the airframe;

a second rotor assembly offset from the first rotor assembly along the rotation axis and supported for rotation about the rotation axis by the airframe;
a drive system operably connected to the first rotor assembly and the second rotor assembly and external of the airframe including:
a first electric motor connected to the first rotor assembly and configured to rotate the first rotor assembly about the rotation axis; and
a second electric motor connected to the second rotor assembly and, while each of the first electric motor and the second electric motor is in operation, the second electric motor is configured to rotate the second rotor assembly about the rotation axis independent of rotation of the first rotor assembly about the rotation axis,
wherein the second rotor assembly is axially interposed along the rotation axis between the first rotor assembly and the airframe, the second rotor assembly axially overlaying the airframe and arranged below the first rotor assembly.

12. The rotorcraft as recited in claim 11, wherein the second electric motor and the second rotor assembly are coaxially arranged about the rotation axis.

13. The rotorcraft as recited in claim 11, wherein the second electric motor includes a rotor portion supported for rotation relative to a stator portion, wherein the rotor portion of the second electric motor is fixed relative to the second rotor assembly.

14. The rotor system as recited in claim 13, further including a static mast extending between the first rotor assembly and the second rotor assembly, wherein the stator portion of the second electric motor is connected to the static mast.

15. The rotor system as recited in claim 13, wherein the rotor portion of the second electric motor is disposed radially outward of the stator portion of the second electric motor relative to the rotation axis.

16. The rotorcraft as recited in claim 11, wherein the rotorcraft defines a longitudinal axis, wherein the airframe includes a longitudinally extending tail mounting a translational thrust system with pusher prop rotatable about a thrust axis parallel to the longitudinal axis, wherein the rotation axis defined by the first rotor assembly is orthogonal to the thrust axis.

17. The rotorcraft as recited in claim 11, further comprising:
a first heat exchanger in thermal communication with the first electric motor, wherein the first heat exchanger is disposed axially along the rotation axis between the first rotor assembly and the second rotor assembly; and
a second heat exchanger in thermal communication with the second electric motor, wherein the second heat exchanger is disposed axially along the rotation axis between the first rotor assembly and the second rotor assembly.

18. A method of operating a rotor system, comprising:
receiving torque at a first rotor assembly from a first electric motor;
rotating the first rotor assembly about a rotation axis using the torque received from the first electric motor;
receiving torque at a second rotor assembly from a second electric motor; and
rotating the second rotor assembly about the rotation axis using the torque received from the second electric motor
wherein the first electric motor applies the torque to the first rotor assembly directly,
wherein while the first electric motor and the second electric motor are in operation rotation of the first rotor assembly about the rotation axis is independent of rotation of the second rotor assembly.

19. A method as recited in claim 18, further including varying rotation of the second rotor assembly about the rotation axis relative to the first rotor assembly.

20. A method as recited in claims 18, further including varying rotational speed of the second rotor assembly about the rotation axis relative to rotational speed of the first rotor assembly about the rotation axis.

21. A method as recited in claim 18, further including:
receiving torque at the second rotor assembly from a second electric motor;
rotating the second rotor assembly about a rotation axis using the torque received from the second electric motor,
wherein the second electric motor applies the torque to the second rotor assembly directly,
wherein rotation the second rotor assembly about the rotation axis is independent of rotation of the first rotor assembly about the rotation axis; and
varying rotational speed of the second rotor assembly about the rotation axis relative to rotational speed of the first rotor assembly about the rotation axis.

* * * * *